Patented May 7, 1946

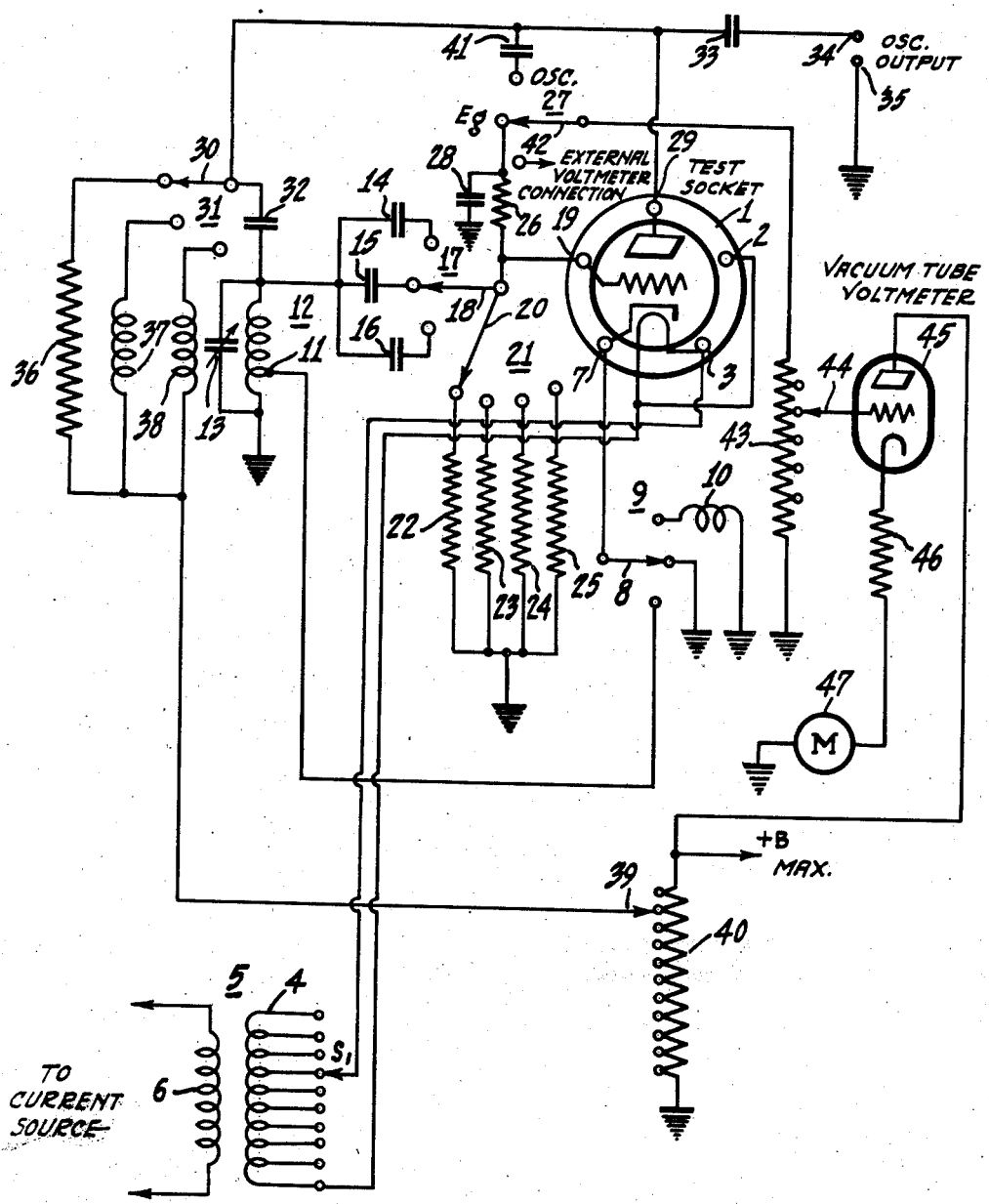

2,399,859

UNITED STATES PATENT OFFICE 2,399,859

THERMIONIC TUBE TEST APPARATUS

James B. Crawley, Edenton, N. C., assignor to Radio Corporation of America, a corporation of Delaware Application February 24, 1944, Serial No. 523,736

2 Claims. (Cl. 315—369)

This invention relates generally to thermionic tube test apparatus and more particularly to an improved test set for measuring the operating characteristics of thermionic tubes in combination with thermionic tube generating and voltage measuring apparatus.

Many tubes employed in modern radio receivers and transmitters include one or more control electrodes in addition to the cathode and anode electrodes. Such multi-electrode thermionic tubes may be employed to amplify or to generate radio frequency voltages. In order properly to test tubes of these types, a true measure of tube efficiency only is obtainable by testing the tube in a circuit comparable to the circuit in which it is to be regularly utilized. Since test sets ordinarily are required to be portable in nature, it obviously would be impossible to include all customary receiver and transmitter circuit elements for testing a large variety of thermionic discharge tubes.

Because of simplicity and low cost, the emission type tube tester has been most generally used. In this type of tester the anode and all control electrodes are connected together, and a voltage of the order of 30 volts is applied between the cathode and the parallel-connected electrodes. A current meter connected in series with the voltage source provides a comparative indication of the tube cathode emission. A tapped transformer is employed to supply the correct cathode voltage for the particular tube under test. Such emission testers do not provide satisfactory test information concerning the amplifying or generating characteristics of multi-electrode tubes.

Dynamic mutual conductance testers wherein the various tube electrodes are connected to proper operating potentials, and wherein the amplified output current responsive to a fixed input signal is measured, provide a tube efficiency test for one predetermined value of control grid voltage. However, a completely satisfactory test requires that the control grid bias voltage be varied over a reasonable range.

The instant invention contemplates a tube tester wherein a plurality of different circuit elements may be connected selectively to the anode, cathode and control electrode terminals of the test socket to provide thermionic tube oscillating circuits of predetermined proportions and resonant frequencies. A thermionic tube voltmeter, or other indicator, may be connected to the control electrode of the tube under test to measure the grid bias voltage developed in response to the generated oscillations. The measuring instrument alternatively may be connected to the anode portion of the oscillating circuit to measure the voltage amplitude of the generated high frequency oscillations. Connections are provided for employing the oscillations thus generated as a test generator source for energizing external apparatus such, for example, as in "lining-up" a conventional radio receiver. In addition, the vacuum tube voltmeter or other measuring apparatus may be connected to external equipment for conventional voltage measurements. The customary tapped transformers and resistors employed in the mutual conductance type testers are included to provide desired operating voltages for the several tube electrodes.

Among the objects of the invention are to provide an improved method of and means for testing thermionic discharge tubes. Another object of the invention is to provide an improved method of and means for testing thermionic tube circuits and apparatus. An additional object of the invention is to provide improved thermionic tube apparatus comprising means for testing a thermionic tube as an oscillation generator, means for measuring alternatively the generated grid bias voltage or the generated high frequency voltage developed by such oscillations, means for providing a source of high frequency test oscillations and means for providing a thermionic tube measuring circuit for external measurements.

The invention will be described in greater detail by reference to the accompanying drawing of which the single figure is a schematic circuit diagram of a preferred embodiment thereof.

Referring to the drawing, the tube tester includes a test socket (or sockets) 1 for the different types of thermionic tubes to be tested. The heater terminals 2, 3 are connected through a first switch S—1 to a tapped secondary winding 4 of a heater transformer 5, the primary winding 6 of which is connected to a source of alternating potential. The cathode terminal 7 of the test socket 1 is connected to the movable contact 8 of a second switch 9. One fixed contact of the second switch 9 is connected through a first inductor 10 to ground. A second fixed contact of the second switch 9 is connected directly to ground. A third fixed contact of the second switch 9 is connected to an intermediate point 11 on an oscillator inductor 12, one end terminal of which is grounded. A fixed, or variable, tuning capacitor 13 is connected in parallel with the oscillator inductor 12. The ungrounded end terminals of the oscillator inductor 12 and tuning capacitor 13 are connected to the common terminals of a plurality of different-sized grid capacitors 14, 15, 16. The remaining terminals of the grid capacitors 14, 15, 16 are terminated in fixed contacts of a third switch 17. The movable contact 18 of the third switch 17 is connected to the control electrode terminal 19 of the test socket, and to the movable contact 20 of a fourth switch 21. The fixed contacts of the fourth switch 21 are connected through separate different grid resistors 22, 23, 24, 25 to ground.

The grid terminal 19 of the test socket 1 also is connected through a smoothing resistor 26 to a fixed contact of a fifth switch 27 which is connected through a bypass capacitor 28 to ground. The smoothing resistor 26 and bypass capacitor 28 comprise an RC filter for the measuring circuit of the oscillator grid voltage to be described hereinafter.

The anode terminal 29 of the test socket 1 is connected to the movable contact 30 of a sixth switch 31, through a feed-back capacitor 32 to the ungrounded common terminals of the oscillator inductor 12 and tuning capacitor 13, and through an output capacitor 33 to a high potential oscillator output terminal 34. The remaining output terminal 35 is grounded.

The fixed contacts of the sixth switch 31 are connected, respectively, through a feedback resistor 36; and through oppositely-phased feedback reactors 37, 38, coupled to the oscillator reactor 12; to an adjustable tap 39 upon a first voltage divider 40. The first voltage divider 40 is connected across a source of relatively high D.-C. voltage, such, for example, as a conventional high voltage rectifier circuit, not shown.

The anode terminal 29 of the test socket 1 also is connected through a second output capacitor 41 to a second fixed contact of the fifth switch 27. An additional fixed contact of the fifth switch 27 is connected to an external terminal for applying voltage from any source of external voltage to be measured.

The movable contact 42 of the fifth switch 27 is connected to one end of a second voltage divider 43. The remaining terminal of the voltage divider 43 is grounded. A movable tap 44 on the second voltage divider 43 is connected to the control electrode of a vacuum tube voltmeter tube 45. The anode of the voltmeter tube 45 is connected to the high potential terminal of the first voltage divider 40 to provide anode voltage therefor. The cathode of the vacuum tube voltmeter tube 45 is connected, through a cathode resistor 46 and an indicating current meter 47, to ground. The indicating meter 47 preferably should be calibrated in terms of the voltage applied across the second voltage divider 43.

In operation, the operating potentials for the heater and anode electrodes of the tube under test in the test socket 1 are adjusted by means of the first switch S1 and the movable tap 39 on the first voltage divider 40, respectively. The desired value of the grid capacitor for the tube under test is selected by adjusting the third switch 17. Similarly, the value of grid leak for the tube under test is selected by adjusting the fourth switch 21.

Adjustment of the second switch 9 and the sixth switch 31 provides a convenient method of connecting the oscillation circuit elements to the tube socket to provide the desired type of oscillation circuit for the tube under test.

Actuation of the fifth switch 27 selectively connects the input of the vacuum tube voltmeter either to (1) the grid electrode of the tube under test, (2) the oscillator anode circuit or (3) the terminal for a source of external voltage to be measured.

When the fifth switch movable contact is connected to the grid electrode terminal 19 of the test socket 1, the vacuum tube voltmeter indicator 47 provides an indication of the grid bias voltage developed in the tube under test, in response to the generated oscillations, for the preselected oscillator circuit connections as determined by the positions of the second, third, fourth and sixth switches 9, 17, 21 and 31, respectively.

Similarly, when the fifth switch 27 is connected to the oscillator anode circuit through the second output capacitor 41, the vacuum tube voltmeter indicator 47 provides an indication of the magnitude of the generated high frequency output voltages. If desired, a separate diode detector may be substituted for the vacuum tube voltmeter for measuring the magnitude of the generated oscillations.

As explained heretofore, the high frequency oscillations applied to the oscillator output terminals 34, 35 may be employed for testing external apparatus such, for example, as for "lining-up" a conventional radio receiver.

It should be understood that the various switching arrangements may be predetermined with respect to the desired efficiency tests on particular types of thermionic tubes, and that the indicating meter 47 may be calibrated in any manner most convenient for indicating particular tube operating characteristics. The various switches may be of either the rotary or push-button types common to thermionic tube test sets.

Thus the invention disclosed comprises a thermionic tube test set wherein tubes under test are operated as oscillation generators in any predetermined type of oscillation circuit, wherein the grid potential developed in response to said oscillations or the oscillation voltage magnitude may be selectively measured, and wherein the generated oscillations may be employed for driving external apparatus.

I claim as my invention:

1. Test apparatus for thermionic discharge tubes including a socket for receiving a tube to be tested, means connected to the terminals of said socket providing a selectively adjustable oscillation circuit for said tube, separate adjustable means connected to said socket for providing adjustable grid bias, cathode and anode voltages for said tube for deriving sustained oscillations therefrom, a thermionic tube voltmeter, and means for selectively connecting said voltmeter to said socket and to said oscillation circuit for providing indications of grid bias voltage and oscillation voltage respectively to provide thereby cooperative indications of the operating efficiency of said tube.

2. Test apparatus for thermionic discharge tubes including a socket for receiving a tube to be tested, means connected to the terminals of said socket providing a selectively adjustable oscillation circuit for said tube, separate adjustable resistive means connected to said socket for providing adjustable grid bias and anode voltages for said tube for deriving sustained oscillations therefrom, adjustable transformer means connected to said socket for providing adjustable cathode energizing voltage for said tube, a thermionic tube voltmeter having a voltage divider connected in its input circuit, and means connected to said voltage divider for selectively connecting said voltmeter to said socket and to said oscillation circuit for providing indications of grid bias voltage and oscillation voltage respectively to provide thereby cooperative indications of the operating efficiency of said tube.

JAMES B. CRAWLEY.